United States Patent [19]

Greer et al.

[11] 4,456,832

[45] Jun. 26, 1984

[54] CIRCUIT BREAKER CONTROL DEVICE

[75] Inventors: Richard H. Greer, Temple City; James B. Newport, Santa Ana, both of Calif.

[73] Assignee: Southern California Edison Company, Rosemead, Calif.

[21] Appl. No.: 178,183

[22] Filed: Aug. 14, 1980

Related U.S. Application Data

[63] Continuation-in-part of Ser. No. 1,707, Jan. 8, 1979, which is a continuation-in-part of Ser. No. 826,073, Aug. 19, 1977, abandoned.

[51] Int. Cl.³ .............................................. H02J 13/00
[52] U.S. Cl. ...................................... 307/38; 307/116; 335/14
[58] Field of Search ...................... 307/116, 35, 38, 39, 307/40, 41, 85, 86; 361/153, 182, 191, 156; 340/310 A, 310 R; 335/14, 20

[56] References Cited

U.S. PATENT DOCUMENTS

| | | | |
|---|---|---|---|
| 3,359,551 | 12/1967 | Dennison | 307/38 |
| 3,404,291 | 10/1968 | Green | 361/182 |
| 3,405,327 | 10/1968 | Cole | 361/153 |
| 3,437,885 | 4/1969 | Kussy | 335/79 |
| 3,475,619 | 10/1969 | Campbell | 307/40 |
| 3,600,635 | 8/1971 | Neilson | 307/39 |
| 3,855,503 | 12/1974 | Ristuccia | 340/310 A |
| 4,020,418 | 4/1977 | Bunage | 324/790 |
| 4,023,043 | 12/1974 | Stevenson | 307/38 |
| 4,164,719 | 8/1979 | Young | 335/20 |

FOREIGN PATENT DOCUMENTS 774781 12/1967 Canada ................................. 307/39

Primary Examiner—Stafford D. Schreyer
Attorney, Agent, or Firm—Lyon & Lyon

[57] ABSTRACT

An energy-efficient device for managing residential loads on electrical generating systems is disclosed. The device is suitable for installation in existing circuit breaker load center panels at low labor costs, to be signalled from Load Management System(s), of various types. The device of the present invention causes the circuit breaker to disconnect and reconnect thereby controlling power consumption during peak periods of energy use. Various alternative embodiments are also disclosed.

12 Claims, 5 Drawing Figures

CIRCUIT BREAKER CONTROL DEVICE

CROSS-REFERENCE TO RELATED APPLICATION

This is a continuation-in-part of application Ser. No. 1,707, filed Jan. 8, 1979, which was a continuation-in-part of application Ser. No. 826,073, filed Aug. 19, 1977, now abandoned.

BACKGROUND OF THE INVENTION

It is well recognized that electrical energy consumption tends to peak during the heat of the day. Because these peak energy demands exist during only a portion of the day this energy is generally supplied by smaller capacity power-plants. The obvious result is higher cost per kilowatt-hour than energy consumed during non-peak periods. This cost is of course passed on to the consumer. Considerable cost savings would result, both to the consumer and the electrical utility, in addition to conservation of natural resources, if consumers of electrical energy could be persuaded to redistribute their demands to a more uniform level throughout the day.

While economic reasons have been found effective in causing industrial consumers of electrical energy to disperse their demands away from peak demand periods, residential peak loads have thus far proven substantially unmanageable. Most pleas to "turn down the thermostat" and the like appear to be ineffectual. Therefore, utilities in general are seeking ways of controlling customer demands directly to redistribute demand throughout the day. This redistribution is generally referred to as "peak-shaving".

Most existing "peak shaving" systems involve some form of communications, such as ripple signals superimposed on the power system, ratio, power line carrier, or combinations of these types of equipment. Unfortunately, each of the above systems tends to be economically unjustifiable because of costly installation of the controlled devices between the customer's appliances and the circuit breaker housing. In addition to the cost of installation, the utility is put in an unfavorable position if damage to the customer's applicances should occur.

Thus, there has been a need for an economical device that can be installed at low costs for redistributing energy demand away from peak demand periods with minimal risk to a customer's appliances.

SUMMARY OF THE INVENTION

The present invention accomplishes the above objects by use of a control device responsive to either an external or internal, to the load center, command signal to cause a circuit breaker to open, thereby disconnecting the associated, energy-consuming apparatus until the command signal permits the circuit breaker to reclose. If an internal control signal is used, the signal may for example be a ripple signal supplied by a central generating station and carried on the line current itself. Typically, the circuit breaker control device is installed to control only 220 volt circuits, since these circuits usually control high energy devices such as electric clothes dryers and the like. In this manner, the demand for energy may be reduced independently of the consumer, without causing power losses to conventional 110 volt circuits which power clocks and other appliances requiring a constant or emergency power supply.

The control device of the present invention also avoids many of the installation problems of prior art devices. The device may be configured to fit within existing circuit breaker dimensions, and in fact may be packaged as an exact replacement for existing circuit breakers. Thus, installation costs are substantially reduced. Further, since the device is inside the Load Center Panel, it is less subject to tampering than a switching device mounted near or within the appliance to be controlled.

The control device of the present invention is also advantageous in that it controls the energy-consuming circuit in an entirely conventional manner, by simply opening a circuit breaker. Since such power losses are foreseeable, household appliances are designed to sustain them without injury.

It is one object of the present invention to provide an improved controlled circuit breaker.

It is another object of the present invention to provide a cost effective residential load management system.

It is a further object of the present invention to provide an improved load management device for distributing energy demands away from peak periods.

It is another object of the present invention to provide an energy efficient controlled circuit breaker.

It is a further object of the present invention to provide a residential load management system which is not injurious to the appliances of customers.

It is yet another object of the present invention to provide a controlled circuit breaker which does not require constant energization.

Other and further advantages of the present invention will be apparent from the following detailed description.

IN THE DRAWINGS

DETAILED DESCRIPTION OF THE INVENTION

Figure 1:
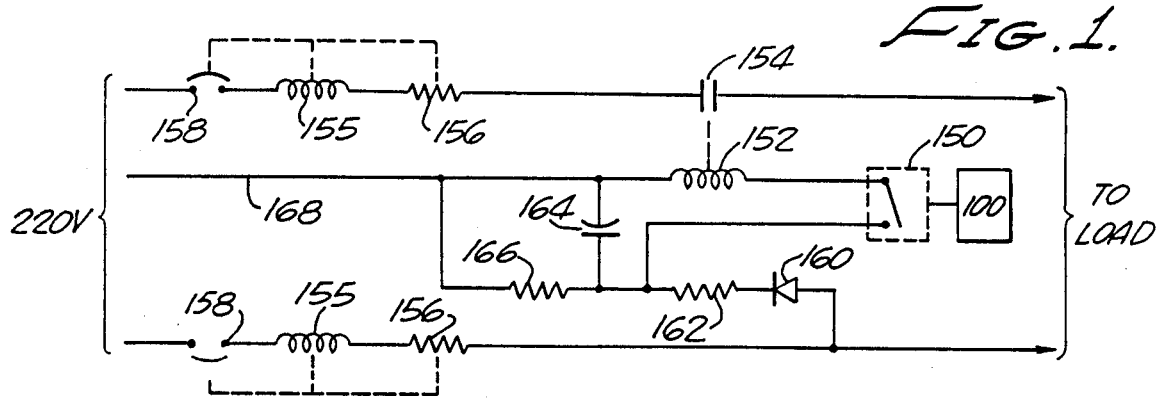
FIG. 1 is a schematic diagram of a first embodiment of the invention.

Referring now to FIG. 1, there is shown therein a first embodiment of the load management device of the present invention. In this embodiment the control device is integrated into the circuit breaker package itself, yielding a single unit which accomplishes both purposes. Since the unitary package will outwardly appear to be a conventional circuit breaker, the package has not been illustrated.

A controller 100, such as a ripple receiver, time clock, or other suitable device, provides a signal which operates a switch 150. The switch 150 is of the momentary contact type and controls an impulse relay coil 152, causing the impulse relay contacts 154 to open or close depending upon the previous state of the contacts. More specifically, power (typically from a 220 v source) is applied through conventional magnetic and thermal trip elements 155 and 156, together with their associated trip contact 158, to the anode of a rectifier diode 160. The anode of the diode 160 is connected to a resistor 162, the remote terminal of which is connected to one terminal of a capacitor 164, one terminal of a second resistor 166, and one leg of the switch 150. The remaining terminals of the resistor 166 and the capacitor 164 are connected to the neutral bus 168 of the 220 v source. The neutral bus 168 is also connected to the coil 152, the remote terminal of which is connected to the remaining leg of the switch 150.

The impulse relay 152 is operated in the following manner. The resistors 162 and 166 form a voltage divider through which the capacitor 164 is charged. The relative values of the resistors are adjusted to provide the voltage necessary to energize the impulse relay 152, for example 30 volts.

Once the capacitor 164 is suitably charged, momentary closure of the switch 150 causes the impulse relay coil 152 to energize from the charge stored on the capacitor 164. Assuming the contacts 154 were previously open, energization of the coil 152 causes the contacts 154 to close and mechanically lock closed, a feature which is characteristic of the impulse relays described herein. With the contacts 154 closed, the appliances connected to the outputs of the device will operate in an entirely conventional manner. The impulse relay 152 is typically maintained in this state, with the contacts 154 closed, during non-peak periods of energy demand.

If demand for electrical energy should rise to a level that load management is required, the impulse relay contacts 154 may be caused to open by momentary closure of the switch 150 by a signal from the controller 100 or otherwise. This momentary closure will cause the coil to energize by the circuit through the capacitor 164, which will have recharged when the switch 150 returns to the open position. When the coil 152 energizes, the mechanical lock of the relay 152 is released and the contacts 154 open, disconnecting that leg of the circuit from the power source. Thus, an effective means for externally controlling residential demands for electrical energy is disclosed.

At some point, the demand for electrical energy will have reduced sufficiently to permit appliance to be reconnected, by closing the contacts 154 of the impulse relay 152. This is again caused by a momentary closure of the switch 150 by a signal from the controller 100 or other suitable means. The capacitor 164, again being charged, causes the coil of the impulse relay 152 to energize, closing and locking the contacts 154. It should be noted that the embodiment shown in FIG. 1 requires energization of the control circuitry only during switching, and thus provides an economical and energy-efficient controlled circuit breaker.

Because the controlled circuit breaker of FIG. 1 may be packaged as an exact replacement for existing circuit breakers, the present invention may be installed in conventional circuit breaker panels (not shown). This permits the controlled circuit breaker of the present invention to be covered to inhibit the consumer from disconnecting or otherwise tampering with the controlled device. The result is that demand for electrical energy can be controlled independently of the consumer, so that these demands may be shifted away from periods of peak energy use.

The controller 100, as previously described, typically comprises a ripple receiver, time clock or other suitable device. Depending upon application, a single controller may be employed to control a plurality of devices, or a number of controllers may be employed to manage different circuits at different times during the day. Likewise, a different controller may be employed for each controlled circuit.

Figure 2:
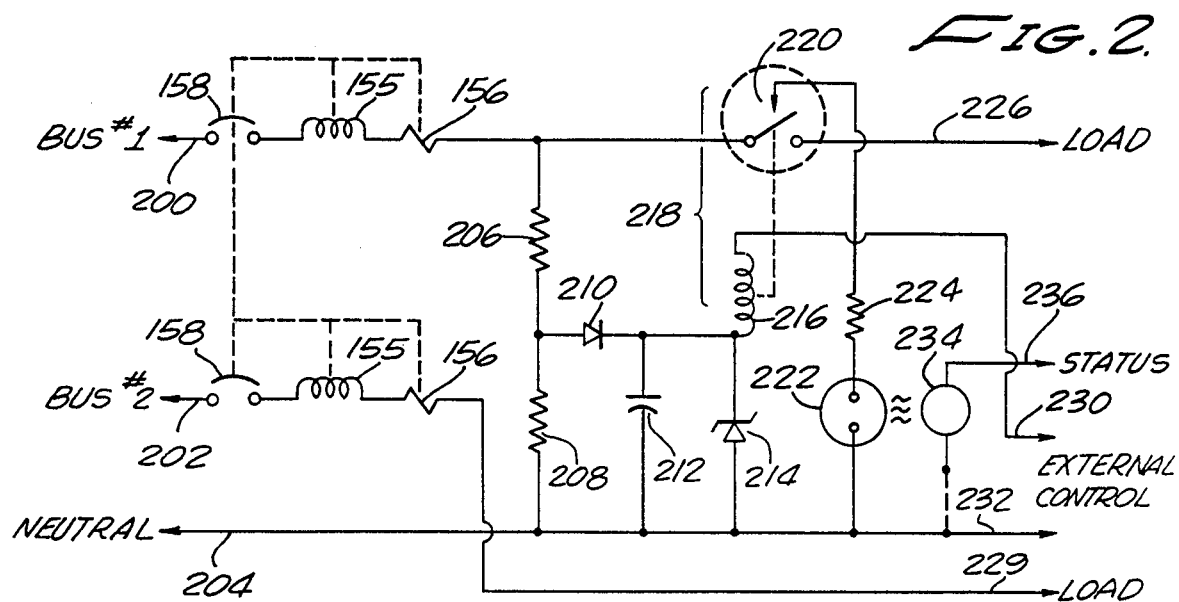
FIG. 2 is a schematic diagram of a second embodiment of the invention.

Turning now to FIG. 2, there is shown therein a second embodiment of the present invention. As with the device shown in FIG. 1, line current, typically 220 volts is supplied across the lines 200 and 202, with the line 204 being neutral. Conventional magnetic trip elements 155, thermal trip elements 156 and associated contacts 158 are provided in each of the lines 200 and 202. A pair of resistors 206 and 208 form a voltage divider, the junction of which is connected to a rectifying diode 210. The anode of the diode 210 is connected to one terminal of a capacitor 212, the anode of a zener diode 214 and a coil 216 of an impulse relay 218. The values of the resistors 206 and 208 are adjusted to suitably charge the capacitor 212 through the rectifying diode 210, while the zener diode 214 is provided to prevent damage to the capacitor 212 by line surges.

The coil 216 of the impulse relay 218 is associated with a pair of contacts 220. A photo-optical device 222, such as an LED, may be connected with the contacts 220 to provide an indication of the status of the contacts. A resistor 224 may also be provided for current limiting.

The remaining terminal of the coil 216 is connected to a controller such as the control device 100 in combination with the momentary switch 150 shown in FIG. 1. Thus, when energy demand is such that the load is to be disconnected from the source at lines 200 and 202, the controller 100 signals the switching element 150 and causes the coil 216 to energize, thereby opening the contacts 220. Similarly, when the energy demand is low enough that the appliances or other loading devices connected to the lines 226 and 228 are permitted to be used, the coil 216 is again energized to change the state of the contacts 220, thereby connecting the lines 200 and 202 to the lines 226 and 228. The control signals may also be supplied via telephone lines connected to the external control lines 230 and 232.

Figure 3:
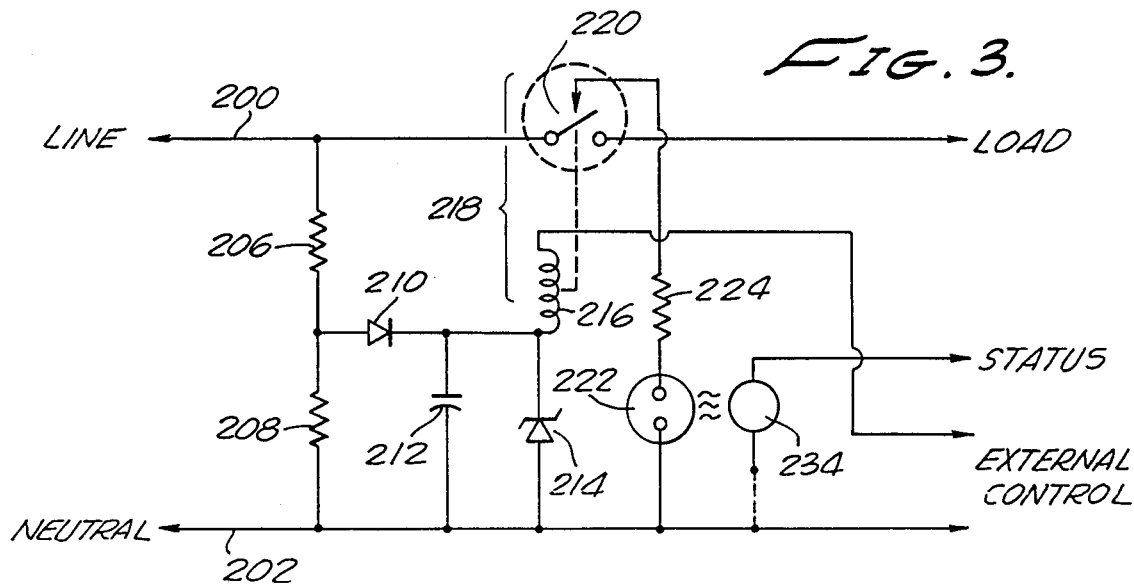
FIG. 3 is a schematic diagram of an embodiment suitable for use with existing circuit breakers.

For at least some applications, it is preferable that the control circuitry be integrated with the circuit breaker itself. However, in some other instances this may not be preferable. For such applications, the embodiments shown in FIG. 3 may be preferred. As can be appreciated from a comparison of FIG. 2 and FIG. 3, the control circuitry therein is substantially similar and parts having like function have been given like numbers. The device shown in FIG. 3 is suitable for connection between a source and load independently of a circuit breaker. However, the control and status ports are provided in the same manner as for FIG. 2.

Figure 4:
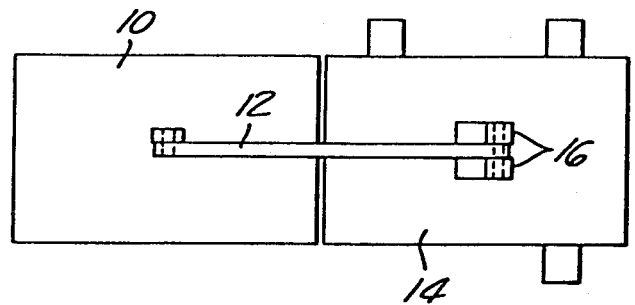
FIG. 4 illustrates the present invention in a housing suitable from installation in an existing circuit breaker panel.

Referring now to FIG. 4, there is shown therein a housing 10 suitable for use with the load management circuitry shown in FIG. 1, although minor changes described hereinafter and deemed obvious to one skilled in the art may be desirable for certain of the embodiments. The housing 10 is configured to fit into existing circuit panels, contacting the main busses and fastening in an entirely conventional manner. An arm 12 connects the housing 10 with its enclosed load management circuitry at the reset levers 16. The circuit breaker is generally of the 220 volt type, and the housing 10 is positioned directly opposite the circuit breaker 14 in the panel (not shown) so that the arm 12 may freely control the reset levers 16, thereby controlling the state of the circuit breaker 14. Taken with reference to FIG. 5, the operation of this first embodiment of load management device can be understood.

Figure 5:
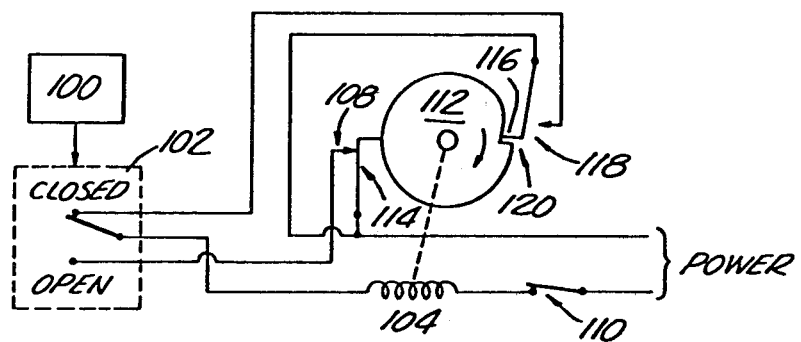
FIG. 5 is a schematic diagram of another embodiment of the invention.

FIG. 5 illustrates in schematic diagram form the load management circuit contained within the housing 10 of FIG. 4. A controller 100, such as a ripple receiver, time clock or other suitable device, applies a signal which operates a switch 102. The switch 102 is typically of the single pole, double throw type, and moves between "open" and "closed" positions.

During normal operation,—i.e., during non-peak periods—the controller 100 will cause the switch 102 to remain in the closed position, which permits the circuit breaker 14 (FIG. 4) to operate in the conventional manner and therefore allows any energy-consuming appliances connected thereto to operate. However, occasionally during peak demand periods the controller 100 will signal the switch 102 to move the open position.

When the switch 102 moves to the open position, a motor 104 is energized from conventional line current applied at the terminals marked "power", although other power sources may be preferred, depending upon application. The motor is energized by a circuit through a pair of contacts 108, the switch 102, the motor 104, and a current limit switch 110. When the motor coils energize, a cam 112 associated therewith is caused to rotate. The cam 112 is connected to the arm 12 (FIG. 4) which controls the reset levers 16 of the breaker 14. When the cam 112 rotates, the reset levers 16 are moved to the "off" position, thereby disconnecting all associated appliances.

To ensure that the cam 112 rotates only until the circuit breaker 14 has opened, the motor 104 is de-energized when the cam has rotated sufficiently to open the breaker 14. More specifically, when the cam rotates 180° the feeler contact 114 drops into the depression 116 on the cam 112, thereby opening the contacts 108. This breaks the circuit to the motor 104, causing the cam to stop rotating with the breaker 14 in the open position. It should also be noted that another pair of contacts 118 close when the cam 112 rotates, for purposes which will be explained hereinafter.

Once the breaker 14 has been turned off (opened) by the cam-actuated arm 12, the appliances connected to that circuit are prevented from consuming energy. Because the housing 10 (FIG. 4) is configured to fit within the circuit breaker panel (not shown), the housing-breaker assembly may be sealed to prevent the consumer from disconnecting or otherwise tampering with the control device. The result is that residential demands for electrical energy may be controlled independently of the consumer, so that these demands may be shifted away from periods of peak energy use.

At some point, the demand for electrical energy will have reduced sufficiently to permit the breaker 14 to be closed and the associated appliances operated. To accomplish this, the controller 100 (FIG. 5) will signal the switch 102 to close, thereby energizing the motor 104 through the new closed contacts 118. Again the motor 104 causes the cam 112 to rotate, driving the arm 12 (FIG. 4) until the breaker 14 closes. When the cam has rotated the 180° necessary to close the breaker 14, the feeler contact 120 of the contact pair 118 drops into the depression 116, thereby breaking the circuit to the motor 104. Thus, the control device is restored to the condition shown in FIG. 5, and any appliances associated with the controlled circuit breaker may be operated normally.

Occasionally, an electrical fault will appear on the consumer's circuit, such as by a defective appliance, and the breaker will "trip", or turn off in the normal manner. If the fault still exists when the control device of FIG. 5 attempts to close the breaker 14, it is important that the control device recognize the existence of the fault and be prevented from closing the breaker 14. This protection is provided by the current limit switch 110, which senses a "trip" condition on the breaker 14 and prevents the motor 104 from energizing until the fault is corrected.

From the above it can be appreciated that a new and effective circuit breaker control device, useful for managing residential demands for electrical energy in an energy efficient manner, has been disclosed. Having fully described the invention, it is to be understood that the embodiments disclosed herein are exemplary only. Many equivalents and alternatives will be apparent to those skilled in the art, based on the teachings herein, and it is intended that the equivalents and alternatives be included within the scope of the invention.

We claim:

1. Load management apparatus including
a manually operable switching section and
a remotely operable management section;
said switching section including interrupter contact means,
a manually operable spring powered first mechanism connected to said interrupter contact means for opening and closing thereof,
fault responsive trip means operatively connected to said first mechanism to operate the latter for opening of said interrupter contact means upon the occurrence of predetermined fault currents at said switching section;
said management section including
mechanical main contact means connected in series circuit with said interrupter contact means and an electrical load energized through said apparatus,
biasing means normally maintaining said main contact means closed,
remotely controlled electrically powered operator means operatively connected to said main contact means for selectively operating the latter to open said main contact means;
said switching section and said management section constituting first and second modules respectively;
said first and second modules including respective first and second housings of substantially equal widths stacked side by side.

2. Load management apparatus as set forth in claim 1 in which the housings have similar profiles.

3. Load management apparatus as set forth in claim 1 also including latch means for maintaining said main contact means open after opening thereof by said operator means.

4. Load management apparatus as set forth in claim 3 also including remotely controlled electrically powered release means operatively connected to said latch means for selectively unlatching the latter thereby permitting the biasing means to close said main contact means.

5. Load management apparatus including
a manually operable switching section and
a remotely operable management section;
said switching section including interrupter contact means, a manually operable spring powered first mechanism connected to said interrupter contact means for opening and closing thereof, fault responsive trip means operatively connected to said first mechanism to operate the latter for opening of said interrupter contact means upon the occurrence of predetermined fault currents at said switching section;

said management section including main contact means connected in series circuit with said interrupter contact means and an electrical load energized through said apparatus, a spring powered second mechanism connected to said main contact means for opening and closing thereof, remotely controlled electrically powered operator means operatively connected to said second mechanism for selectively operating the latter to open and close said main contact means.

6. Load management apparatus as set forth in claim 5 in which the switching and management sections constitute first and second modules, respectively;

said first module including a relatively narrow first housing wherein said interrupter contact means, said first mechanism and fault responsive trip means are mounted;

said second module including a relatively narrow second housing wherein said main contact means, said second mechanism and said operator means are mounted;

said housing being substantially of equal width and having generally similar profile dimensions.

7. A circuit breaker including a cooperating contact means, a manually operable overcenter spring-type operating mechanism for opening and closing said contact means, automatic trip means operatively connected to said operating mechanism and operative responsive to predetermined fault current conditions to actuate said operating mechanism for opening said contact means, auxiliary means including a first section operable independently of said operating mechanism and said trip means to open said contact means responsive to a first control signal generated remote from said circuit breaker.

8. A circuit breaker contact as set forth in claim 7 in which the first section of the auxiliary means is operable from a first to a second position upon receipt of the first control signal, said auxiliary means also including a second section for maintaining said first section in said second position, said contact means being held open by said first section when the latter is in said second position, said second section being releaseable to permit said first section to return to said first position wherein said operating mechanism may close said contact means.

9. A circuit breaker contact as set forth in claim 7 in which the first section of the auxiliary means includes a solenoid having a coil and an armature movable from a first to a second position upon energization of said coil to act directly on the contact means for opening the latter responsive to receipt of said first control signal.

10. A circuit breaker contact as set forth in claim 9 in which the auxiliary means also includes a second section for maintaining said armature in said second position, said second section being selectively releaseable to permit said armature to return to said first position wherein said operating mechanism may close said contact means.

11. A circuit breaker contact as set forth in claim 9 in which the contact means includes a movable contact mounted at one end of a moveable contact arm, said armature when in said second position operatively engaging said contact arm.

12. A circuit breaker contact as set forth in claim 7 also including a single insulating housing wherein said contact means, said operating mechanism, said automatic trip means and said auxiliary means are disposed.

* * * * *